US009936132B2

(12) United States Patent
Yoon et al.

(10) Patent No.: US 9,936,132 B2
(45) Date of Patent: Apr. 3, 2018

(54) CMOS IMAGE SENSORS WITH FEATURE EXTRACTION

(71) Applicant: The Regents of The University of Michigan, Ann Arbor, MI (US)

(72) Inventors: Euisik Yoon, Superior Township, MI (US); Jaehyuk Choi, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 367 days.

(21) Appl. No.: 14/064,311

(22) Filed: Oct. 28, 2013

(65) Prior Publication Data

US 2014/0118592 A1  May 1, 2014

Related U.S. Application Data

(60) Provisional application No. 61/719,253, filed on Oct. 26, 2012.

(51) Int. Cl.
| H04N 5/335 | (2011.01) |
| H04N 3/14 | (2006.01) |
| H04N 5/232 | (2006.01) |
| H04N 5/369 | (2011.01) |
| H04N 5/3745 | (2011.01) |
| H04N 5/378 | (2011.01) |

(Continued)

(52) U.S. Cl.
CPC ..... *H04N 5/23245* (2013.01); *G06K 9/00986* (2013.01); *G06K 9/4642* (2013.01); *H04N 5/23251* (2013.01); *H04N 5/343* (2013.01); *H04N 5/3698* (2013.01); *H04N 5/378* (2013.01); *H04N 5/37452* (2013.01); *H04N 5/35581* (2013.01)

(58) Field of Classification Search
CPC .......... H04N 5/23245; H04N 5/23251; H04N 5/3698; H04N 5/378; H04N 5/37452
USPC .......................................... 348/308
See application file for complete search history.

(56) References Cited

U.S. PATENT DOCUMENTS 6,590,611 B1 * 7/2003 Ishida .................. H04N 3/1568
250/208.1
9,176,608 B1 * 11/2015 Baldwin .................. G09G 5/00
(Continued)

OTHER PUBLICATIONS

J. Choi et al. "A 1.36 µW Adaptive CMOS Image Sensor with Reconfigurable Modes of Operation from Available Energy/Illumination for Distributed Wireless Sensor Network," ISSCC Dig Tech. Papers, pp. 112-114, Feb. 2012.
(Continued)

Primary Examiner — Sinh Tran
Assistant Examiner — Zhenzhen Wu
(74) Attorney, Agent, or Firm — Reising Ethington P.C.

(57) ABSTRACT

A CMOS imaging sensor with embedded feature extraction capability operatable in different modes by a method that includes the steps of: (a) operating the CMOS imaging sensor in a motion-detecting mode at a first power level using circuitry on the imaging sensor that generates motion data based on received images detected by pixels in the pixel array; (b) switching the imaging sensor from the motion-detecting mode to a feature extraction mode in response to detecting motion; and (c) operating the imaging sensor in the feature extraction mode at a second power level that is higher than the first power level.

15 Claims, 15 Drawing Sheets

(51) Int. Cl.
*G06K 9/00* (2006.01)
*G06K 9/46* (2006.01)
*H04N 5/343* (2011.01)
*H04N 5/355* (2011.01)

(56) References Cited

U.S. PATENT DOCUMENTS

| | | | | |
|---|---|---|---|---|
| 9,432,605 | B2* | 8/2016 | Kim | H04N 5/37455 |
| 2003/0010896 | A1* | 1/2003 | Kaifu | H04N 3/1562 |
| | | | | 250/208.1 |
| 2005/0206763 | A1* | 9/2005 | Kochi | H04N 3/155 |
| | | | | 348/302 |
| 2006/0062483 | A1* | 3/2006 | Kondo | G06T 7/202 |
| | | | | 382/253 |
| 2007/0070365 | A1* | 3/2007 | Boregowda | G06F 17/3025 |
| | | | | 358/1.9 |
| 2009/0066782 | A1* | 3/2009 | Choi | H04N 3/155 |
| | | | | 348/25 |
| 2010/0104199 | A1* | 4/2010 | Zhang | G06K 9/00798 |
| | | | | 382/199 |
| 2010/0302397 | A1* | 12/2010 | Huang | G06T 7/2053 |
| | | | | 348/222.1 |

OTHER PUBLICATIONS

M.-T. Chung et al., "A 0.5V 4.95 µW 11.8fps PWM CMOS Imager with 82dB Dynamic Range and 0.055% Fixed-Pattern Noise, "ISSCC Dig Tech. Papers, pp. 114-116, Feb. 2012.

S. Chen et al., "A 64×64 Pixels UWB Wireless Temporal-Difference Digital Image Sensor," IEEE Transactions on Very Large Scale Integration (VLSI) Systems, vol. 20, No. 12, pp. 2232-2240, Dec. 2012.

U. Mallik et al., "Temporal Change Threshold Detection Imager," ISSCC Dig Tech. Papers, pp. 362-364, Feb. 2005.

N. Massari et al., "A 100 µW 64×128-Pixel Contrast-Based Asynchronous Binary Vision Sensor for Wireless Sensor Networks," ISSCC Dig Tech. Papers, pp. 588-638, Feb. 2008.

N. Dalal, B. Triggs, "Histogram of Oriented Gradients for Human Detection," CVPR Dig Tech. Papers, pp. 886-893, Jun. 2005.

* cited by examiner

| Process | 0.18 μm 1P4M CMOS | | | |
|---|---|---|---|---|
| Core size | 2.35 x 3.18 mm² | | | |
| Pixel size | 5.9 x 5.9 μm² | | | |
| Pixel array | 256 x 256 | | | |
| Fill factor | 30 % | | | |
| FPN | 0.05 % | | | |
| Dynamic range | 54.8 dB | | | |
| Power supply | Pixel | 1.3 V | | |
| | Digital | 0.8 V | | |
| Power consumption & Power FOM | Mode | Power (@ 15 fps) | Power / frame | FOM (power/pixel·frame) |
| | Motion sensing | 3.31 μW | 0.22 μW | 13.46 pW |
| | Imaging with feature extraction | 51.06 μW | 3.4 μW | 51.94 pW |
| Detection rate of object detection | 94.5 % | | | |

*Figure 6*

| Ref. | [1] | [2] | [3] | [4] | [5] | This work |
|---|---|---|---|---|---|---|
| Process | 0.5 µm CMOS | 0.35 µm CMOS | 0.5 µm CMOS | 0.18 µm CMOS | 0.18 µm CIS | 0.18µm CMOS |
| Pixel array | 90 x 90 | 128 x 64 | 64 x 64 | 64 x 40 | 320 x 240 | 256 x 256 |
| Pixel pitch | 25.2 µm | 26 µm | 33 µm | 10 µm | 5.6 µm | 5.9 µm |
| Fill factor | 17 % | 20 % | 11.5 % | 25.4 % | 45.5 % | 30 % |
| Integrated feature extraction | Temporal change | Contrast change | Temporal change | - | - | Temporal change + HOG |
| Power FOM | 17,700 pW | 244 pW | 1373 pW | 163 pW | 15.4 pW (monitor) 595.3pW (normal) | 13.46 pW (motion) 51.94pW (feature) |

*Figure 8*

[1] U. Mallik, M. Clapp, G. Cauwenberghs, & R. Etienne-Cummings, "Temporal change threshold detection imager," ISSCC Dig Tech. Papers, pp. 362-364, Feb. 2005.
[2] N. Massari, M. Gottardi, S. Jawed, "A 100µW 64×128-Pixel Contrast-Based Asynchronous Binary Vision Sensor for Wireless Sensor Networks," ISSCC Dig Tech. Papers, pp. 588-638, Feb. 2008.
[3] S. Chen; W. Tang; X. Zhang & E. Culurciello, "A 64×64 Pixels UWB Wireless Temporal-Difference Digital Image Sensor," IEEE Transactions on Very Large Scale Integration (VLSI) Systems, vol.20, no.12, pp.2232-2240, Dec. 2012.
[4] M.-T. Chung & C.-C. Hsieh, "A 0.5V 4.95µW 11.8fps PWM CMOS imager with 82dB dynamic range and 0.055% fixed-pattern noise, "ISSCC Dig Tech. Papers, pp. 114-116, Feb. 2012.
[5] J. Choi, S. Park, J. Cho & E. Yoon, "A 1.36µW adaptive CMOS image sensor with reconfigurable modes of operation from available energy/illumination for distributed wireless sensor network," ISSCC Dig Tech. Papers, pp. 112-114, Feb. 2012.

| Process | 0.18 μm 2P4M CIS | | |
|---|---|---|---|
| Core size | 3.32 x 2.98 mm² | | |
| Pixel size | 5.6 x 5.6 μm² | | |
| Pixel array | 336 x 256 | | |
| Fill factor | 45.5 % | | |
| Dynamic range | 57.1 dB (normal) / 99.2 dB (WDR) | | |
| Mode | Normal | High sensitivity | Monitoring |
| Sensitivity [V/lx·sec] | 4.02 | 23.9 | 0.65 |
| FPN [%] | 0.29 | 0.75 | 1.35 |
| Power (Pixel array, @ 15 fps) | 32.3 μW | 69.6 μW | 14.2 μW |
| Power (ADC analog, 1.8 V, @ 15 fps) | 680 μW | 736.3 μW | 0.03 μW |
| Power (Digital, 0.8 V, @ 15 fps) | 55.8 μW | 61.4 μW | 5.62 μW |
| Total Power (@ 15 fps) | 768.1 μW | 867.3 μW | 19.9 μW (@ 15 fps) |
| | | | 1.36 μW (@ 1 fps) |
| Power FOM [pW/pixel·frame] | 595.32 | 672.2 | 15.4 |

*Figure 15*

CMOS IMAGE SENSORS WITH FEATURE EXTRACTION

CROSS-REFERENCE TO RELATED APPLICATION

This application claims the benefit of U.S. Provisional Application No. 61/719,253 filed Oct. 26, 2012, the complete disclosure of which is hereby incorporated by reference.

TECHNICAL FIELD

This invention relates generally to CMOS image sensors and algorithms used with such sensors.

BACKGROUND

Complementary metal oxide semiconductor (CMOS) imaging sensors are often powered by an energy source having limited power. As a result, power consumption can be an important consideration for extending the performance and/or lifetime of these sensor systems. Most CMOS imaging sensors having high sensitivity and dynamic range consume>50 mW, which may be unsuitable for wireless applications. Some low-power imaging sensors are known. These sensors can consume low amounts of power, in some cases<10 μW. However, even low-power sensors that are used to continuously send images may still result in systems that draw unacceptable amounts of power. For instance, the wireless signal transmission of images from CMOS imaging sensors consumes significant amounts of power due to the large bandwidth of image signals. Another way to reduce the bandwidth can be to generate image signals by monitoring temporal changes or contrast changes. But, generating image signals based on temporal changes or contrast changes may cause the sensor to respond to environmental conditions, such as change of illumination or background movement, in addition to actual target objects.

SUMMARY

In accordance with an embodiment of the invention there is provided a method of operating a complementary metal oxide semiconductor (CMOS) imaging sensor having a pixel array and pixel processing circuitry. The method includes the steps of: (a) operating the CMOS imaging sensor in a motion-detecting mode at a first power level using circuitry on the imaging sensor that generates motion data based on received images detected by pixels in the pixel array; (b) switching the imaging sensor from the motion-detecting mode to a feature extraction mode in response to detecting motion; and (c) operating the imaging sensor in the feature extraction mode at a second power level that is higher than the first power level. The imaging sensor generates extracted feature data from one or more received images when operating in the feature extraction mode.

In accordance with another embodiment of the invention there is provided a method of operating a complementary metal oxide semiconductor (CMOS) imaging sensor having a pixel array and pixel processing circuitry. The method involves carryout out the following steps using the pixel processing circuitry: (a) receiving a plurality of rows or columns of pixel data from the pixel array; (b) calculating spatial gradients based on the received rows or columns of pixel data; (c) determining angular information associated with the spatial gradients; and (d) determining magnitudes of the spatial gradients associated with the angular information.

In accordance with yet another embodiment of the invention there is provided a complementary metal oxide semiconductor (CMOS) imaging sensor having a pixel array. The image sensor includes a first pixel having a first in-pixel capacitor, a second pixel located adjacent the first pixel having a second in-pixel capacitor, and a common electrical communication line electrically linking the first pixel and the second pixel, wherein the first pixel and the second pixel each include a source follower readout transistor connected to the common electrical communication line and connected to the respective first in-pixel capacitor or second in-pixel capacitor to provide a differential readout.

BRIEF DESCRIPTION OF THE DRAWINGS

Preferred exemplary embodiments of the invention will hereinafter be described in conjunction with the appended drawings, wherein like designations denote like elements, and wherein:

FIG. 6 includes a performance summary of an exemplary CMOS imaging sensor;

FIG. 8 is a table comparing performance of the CMOS chip of FIG. 7 with known sensor chips;

FIG. 15 is a table summarizing the performance of the sensor chip of FIG. 14.

DESCRIPTION OF THE ILLUSTRATED EMBODIMENTS

Figure 1:
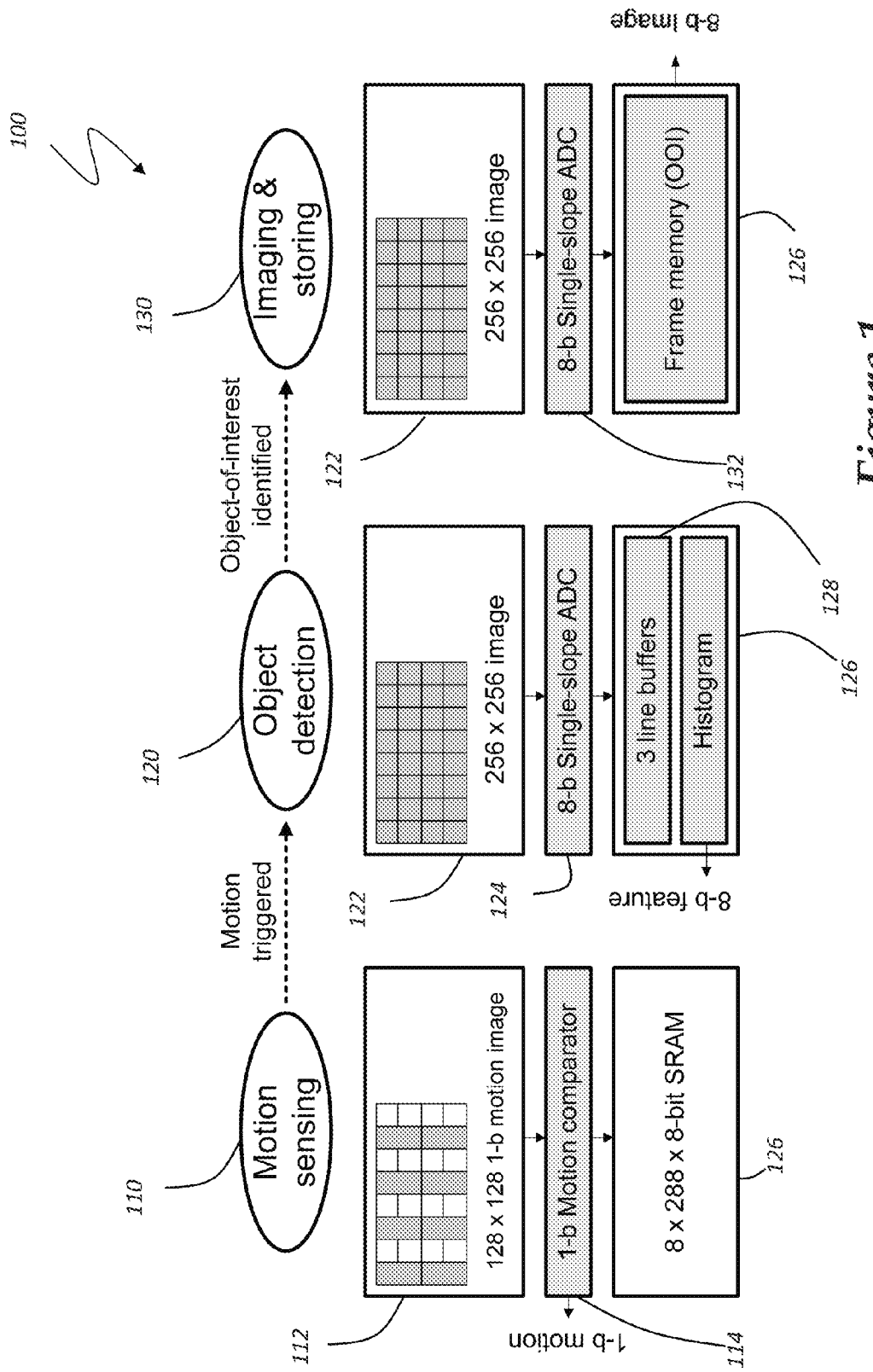
FIG. 1 is a block diagram depicting an exemplary embodiment of a multi-mode operation scheme used with a CMOS imaging sensor.

An imaging device (sensor) can be formed from a low-power CMOS imaging sensor integrated with feature extraction capability to identify objects of interest. Using the feature extraction capability, the CMOS sensor can be placed in a multi-mode operating scheme during which time the sensor exists in a low-power motion-sensing mode that can detect for motion yet does not generate full images. The sensor can operate in the motion-sensing mode until the sensor detects motion. At that time, the sensor can exit the motion-sensing mode, capture an image, and extract features from the captured image. These features can then be used to detect an object of interest within the image. When the object of interest is detected, the sensor can then perform a full-image-capturing operation that results in a higher-resolution image than the image originally-captured.

Changing sensor modes based on the detection of an object of interest (also called Object-of-interest (OOI) imaging) can minimize redundant imaging operation as well as transmission of signals. For instance, the CMOS sensor can remain in a motion-sensing (i.e., sleeping) mode until the detection of motion signals causes the sensor to wake up and change modes. During this motion-sensing mode, the CMOS sensor chip consumes extremely small amounts of power. A signal processing unit which resides either in a host or in a sensor node can detect Objects and provide a 1 bit (b) request signal to initiate further imaging operation if a target object-of-interest is identified. After entering a new mode (e.g., a feature extraction mode), the sensor can generate and transmit 8 b features for detecting objects within an image. In one embodiment of a feature extraction algorithm, a histogram-of-oriented-gradients (HOG) can be used. The HOG can provide a high detection rate of objects while using only 3.5% of bandwidth when compared with conventional 8-b image capturing. It is possible to implement the HOG feature extraction algorithm along with mixed-signal circuitry in order to save both power and space.

This multi-mode operation scheme of the sensor can significantly reduce overall power consumption because the CMOS sensor can selectively capture images only when motion is detected and/or an object-of-interest is present. The use of such a scheme can significantly reduce power consumption and/or bandwidth consumption if images are transmitted. In one embodiment, the CMOS sensor consumes 0.22 µW/frame in motion sensing mode and 3.4 µW/frame for feature extraction. In contrast, existing low-power CMOS imaging sensors may consume ~10 µW/frame without using the multi-mode operating scheme. It is envisioned that the CMOS sensors and the multi-mode operation scheme carried out by such sensors can be used in a wireless network for surveillance, environmental monitoring, traffic management, or other visual monitoring applications. It is also possible that the CMOS sensors and the multi-mode operation scheme carried out by such sensors can be included with wireless biomedical imaging systems or automotive sensors used to detect pedestrians. While these are some examples of the environment in which the present CMOS sensors and the multi-mode operation scheme can be implemented, it should be appreciated that others are possible.

Turning to FIG. 1, a block diagram of an exemplary embodiment of the multi-mode operation scheme 100 is shown. In this embodiment, the scheme 100 includes three different modes of operation to be used with a CMOS imaging sensor(or lust CMOS sensor) that is diagrammatically illustrated in FIG. 1. The CMOS sensor includes a pixel array and pixel processing circuitry used for motion sensing, feature extraction, and image capture. Further details of the pixel array and pixel processing circuitry will be described in connection with FIG. 2. The three modes of operation are a motion-detecting (or motion sensing) mode 110, a feature extraction mode 120, and an image capture (image storing and/or transmission) mode 130. In the motion-detecting mode 110, the CMOS sensor can generate a 128×128 1 b motion map 112 for motion triggering. Column-parallel analog-digital converter (ADC) 114 can be used to serve as a 1 b motion comparator and identify motion. Once the motion is detected, the CMOS sensor can wake up, exit the motion sensing mode 110, and enter the feature extraction mode 120 which may or may not include object detection based on, for example, analysis or comparison of the extracted feature information with one or more models indicative of the object. In the feature extraction mode, the CMOS sensor can generate and transmit 8 b feature signals 124 that are extracted from full 8 b 256×256 images 122. One or more static random access memory (SRAM) blocks 126 can temporarily store intermediate signals during HOG feature calculation(s). One part of SRAM blocks 126 may be allocated for line buffers 128 to store 3 rows of images and the rest can be allocated for feature signal accumulation. In the image capture mode 130, the CMOS sensor can generate and transmit 8 b images 132 upon the request from a host. The SRAM 126 operates as a frame memory which can store region-of-interest images containing the object-of-interest.

Figure 2:
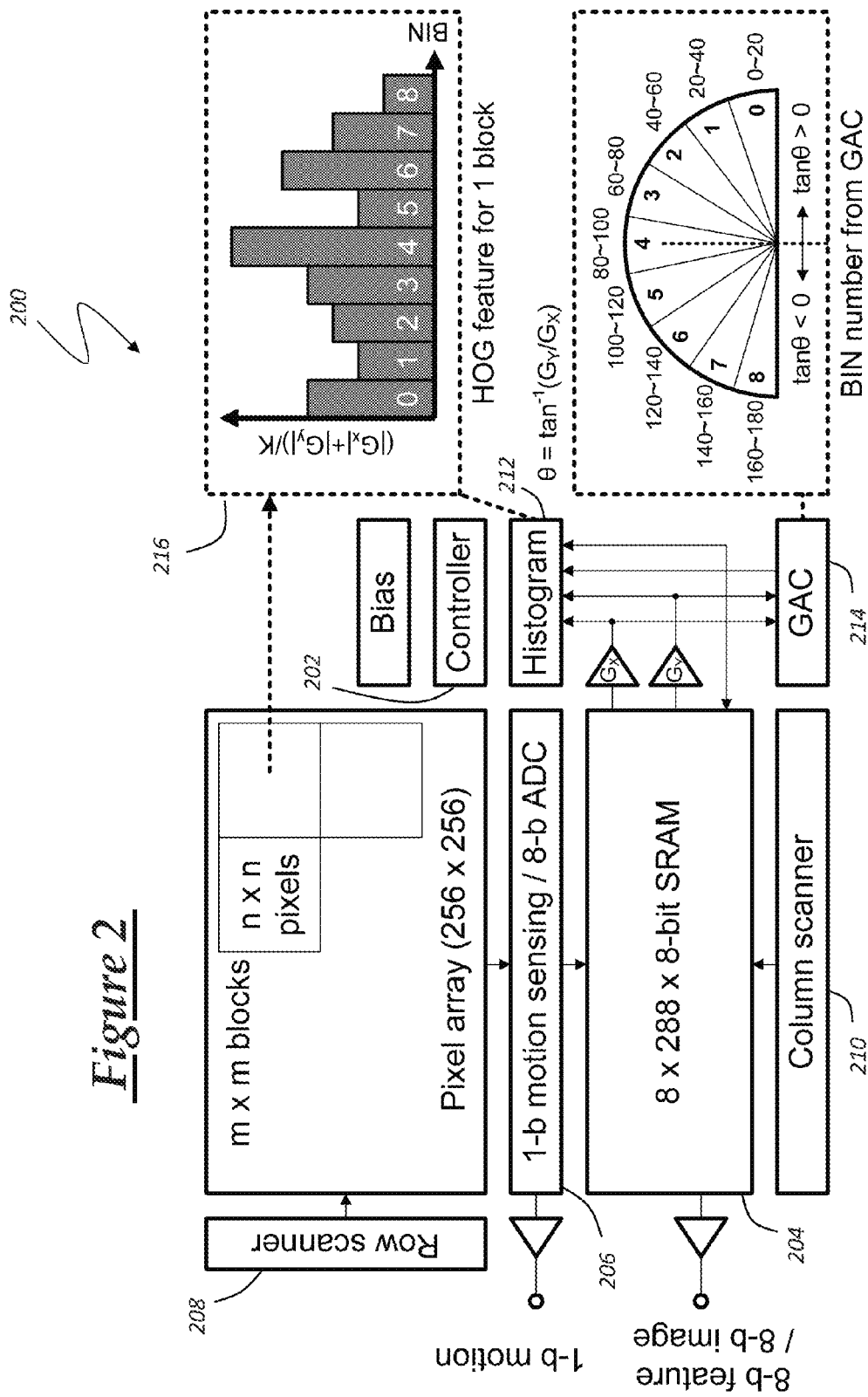
FIG. 2 is a block diagram depicting an exemplary embodiment of the overall architecture of the CMOS imaging sensor.

Turning to FIG. 2, the overall architecture of an exemplary implementation of a CMOS sensor 200 is shown. The sensor 200 can include a controller 202, SRAM 204, a 1 b motion comparator 206, a row scanner 208, a column scanner 210, a histogram generator 212, and a gradient-to-angle converter (GAC) 214. The motion comparator 206 can include one or more column-parallel 8-b single slope ADCs and operate as a 1 b motion comparator in the motion sensing mode. The motion comparator 206 can generate a 1 b motion map with frame-difference signals from a pixel. For HOG feature extraction, it is possible to calculate the magnitude and angle of spatial gradients. A pixel array may be divided into m×m sub-blocks where the size of sub-blocks is fully programmable. A set of histograms 216 that map the magnitude of spatial gradients in each angle can be generated for each block. The processing of feature signal extraction can be carried out as follows: (1) three rows of images can be read out and temporarily stored in SRAM 204; (2) spatial gradients ($G_X$ and $G_Y$) can be calculated with masking $[-1\ 0\ 1]$ and $[-1\ 0\ 1]^T$, respectively; (3) the GAC 214 can generate nine bin numbers which map nine different angles from 0° to 180°; and (4) the histogram generator 212 accumulates the magnitude of the gradients ($|G_X+G_Y|$) corresponding to its angle ($\theta=\tan^{-1}(G_X/G_Y)$) calculated from the GAC 214, and stores them back to SRAM 204. The accumulated magnitudes can be normalized by K in order to deliver full-scale 8-b feature signals.

Figure 3:
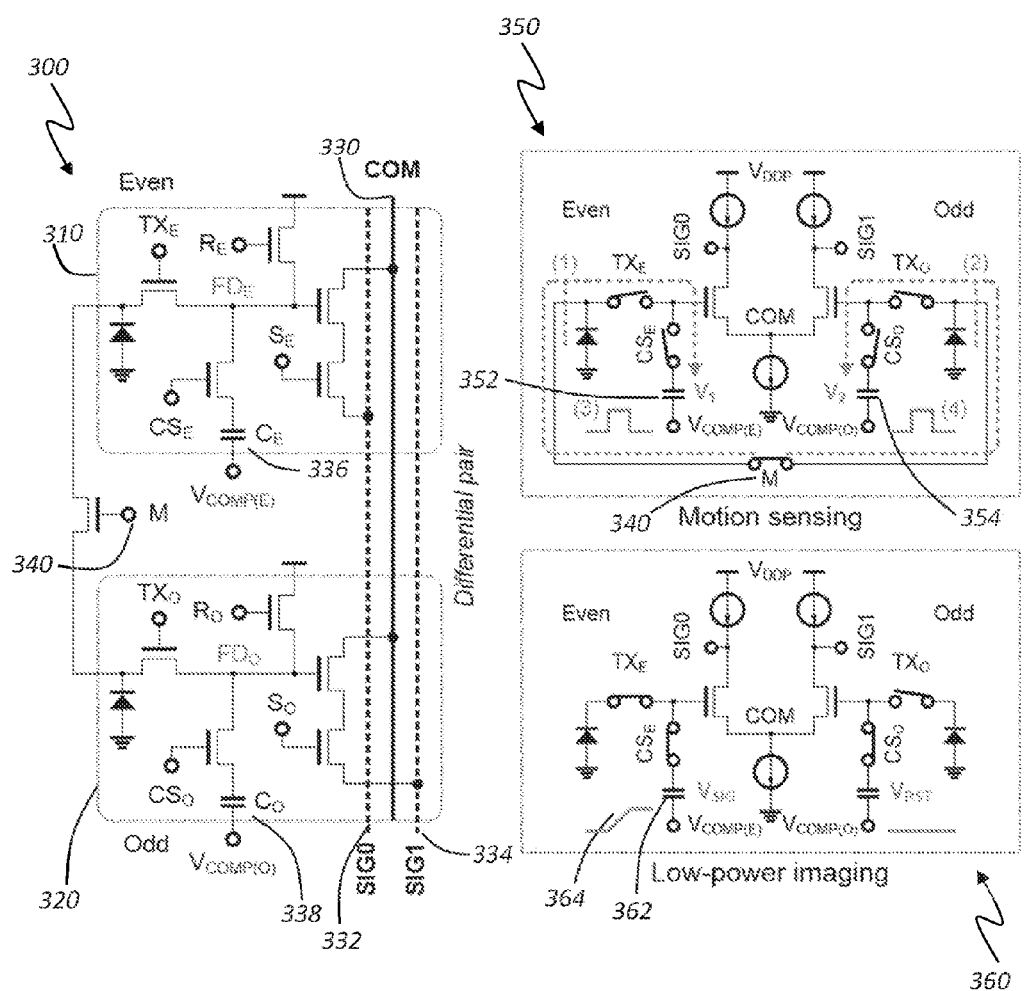
FIG. 3 depicts an exemplary embodiment of a pixel used with the CMOS imaging sensor.

FIG. 3 depicts the architecture of an exemplary pixel 300. The pixel 300 employs a reconfigurable differential topology that enables both source follower readout and differential common source amplification without any additional transistors. Two vertical neighboring pixels 310 and 320, respectfully, share the COM line 330 and connect signals through SIG0 332 and SIG1 334. For the sensor using the pixel 300, an additional in-pixel capacitor $C_{E/O}$ (336 and 338, respectively) can be used as frame buffer memory for motion sensing as well as for low-power imaging. The in-pixel capacitor(s) 336/338 can be implemented using a MIM capacitor, which may be placed on top of pixel circuits. That way, the capacitor may not induce any fill-factor loss. The two vertically neighboring pixels 310/320 are connected with a merging switch (M) 340 for pixel merging. Spatial resolution is scalable due to the small size of the pixel 300, which incorporates in-pixel memory (e.g., analog memory) as well as in-pixel comparators for signal processing.

In the motion sensing mode 350, an operation sequence can be as follows: (1) two pixels can be merged and one in-pixel capacitor 352 can sample a previous frame signal ($V_1$); (2) the other in-pixel capacitor 354 can sample a current frame signal ($V_2$); (3) a short pulse may be applied to $V_{COMP(E)}$ in the even pixel and $V_1$ is compared with $V_2$; and (4) another pulse is applied to $V_{COMP(O)}$ in the odd pixel and two voltages are compared again. When the frame difference $|V_1-V_2|$ is higher than the amplitude of a $V_{COMP}$ pulse swing, 1 b motion output can be generated.

A determination of whether motion exists can be detected by the CMOS sensor using a variety of thresholds. For instance, the CMOS sensor in the motion sensing mode 350 could determine that motion exists based on whether the frame difference $|V_1-V_2|$ is higher than the amplitude of a $V_{COMP}$ pulse swing for a single pixel pair (i.e., two pixels). However, it should also be appreciated that a variable threshold can be set for determining whether motion exists. For example, the CMOS sensor may be programmed to detect motion when the frame difference $|V_1-V_2|$ is higher than the amplitude of a $V_{COMP}$ pulse swing for each of five or more pixel pairs. It should also be appreciated that other values or quantities of pixel pairs other than five can be alternatively used for the variable threshold.

For the low-power imaging 360 mode, the pixel can operate as a pre-amplifier for an 8 b single slope ADC. Here, the integrated signal in a photodiode can be transferred to an in-pixel capacitor 362 in the even pixel whereas the odd pixel keeps the reset voltage. A ramp signal 364 can be applied to $V_{COMP(E)}$ and the potential at the SIG0 node can be dropped due to charge transfer. The latching can occur near the reset voltage. In this scheme, a $V_{GS}$ drop in the amplification transistors may not induce the loss of signal swing as in the conventional source follower readout. That is, the power supply used with the pixel can be scaled down by more than 0.5 V (nominal voltage drop in $V_{GS}$). In the sensor used with the pixel 300, a 1.3V pixel power supply can be used, which significantly saves power consumption in the pixel circuits. The feature extraction described herein can reduce power consumption to an amount less than 3.3 µW.

Figure 4:
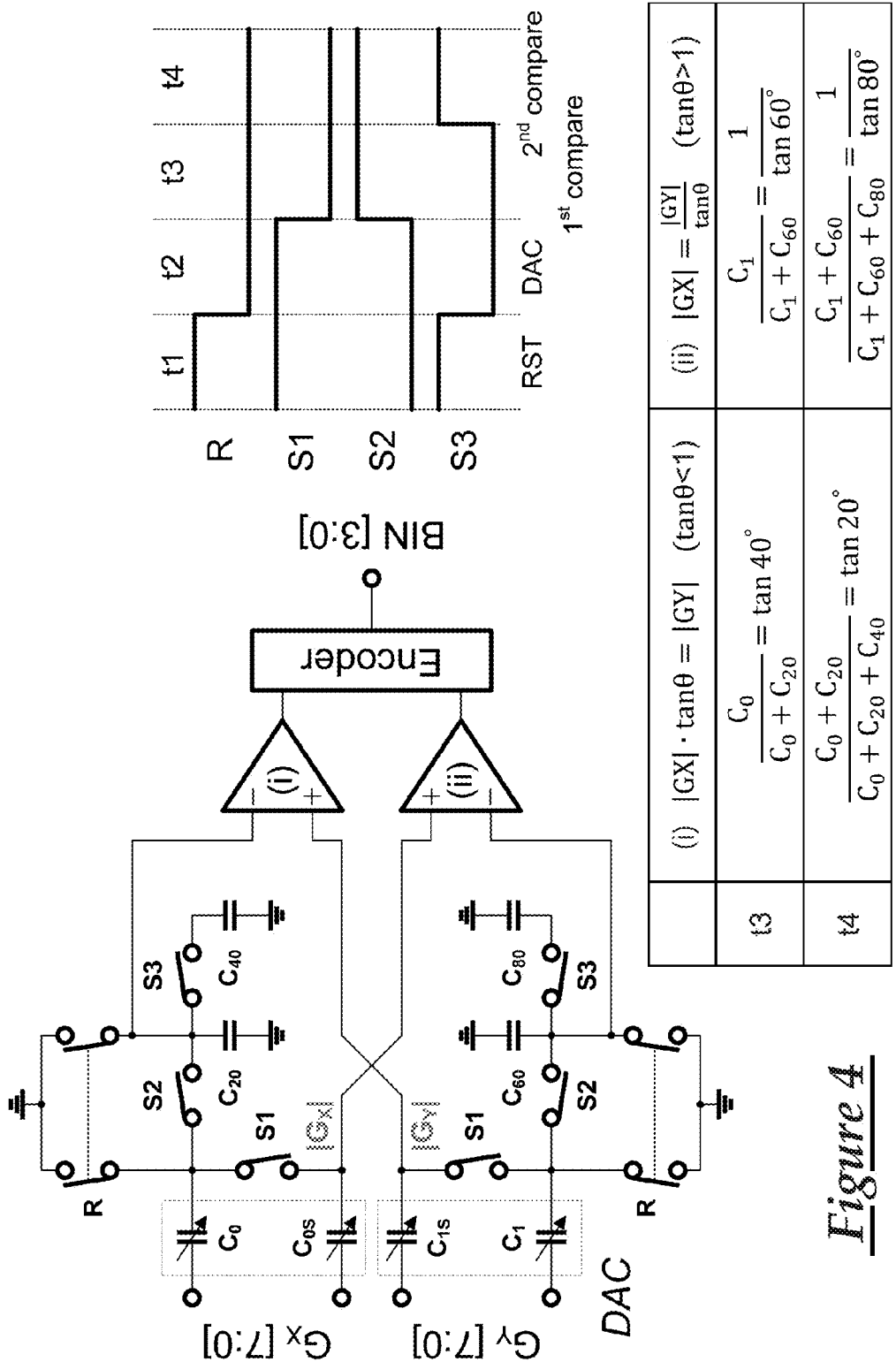
FIG. 4 depicts an exemplary embodiment of a gradient-to-angle (GAC) converter used with the CMOS imaging sensor.

Turning to FIG. 4, an exemplary implementation of a GAC 400 is shown. In the feature extraction mode, the calculation of the angle ($\theta=\tan^{-1}(G_Y/G_X)$) can be carried out using relatively complex operations, such as division and trigonometric functions. However, in the present CMOS sensor a simple mixed-signal approach can be used to avoid digital implementation that may consume significant amounts of space and/or power. The GAC 400 shown in FIG. 4 can generate nine angles from 0° to 180° in 4 b bin numbers. 8 b gradient signals ($G_X$ and $G_Y$) can be converted to analog signals using two binary capacitive digital-to-audio converters (DAC). When the switch S1 is off, the binary DAC output is divided by two. Capacitors ($C_0, C_1$) operate as the part of DAC which generates trigonometric function, while the others ($C_{0s}, C_{1s}$) operate as a hold capacitor, which contains the gradient. The gradient can be multiplied by $\tan\theta$ and $1/\tan\theta$ in each channel, respectively, according to capacitance values of $C_{20}$, $C_{40}$, $C_{60}$, and $C_{80}$. After two-step comparisons during t3 and t4, the angle information can be encoded into a 4 b bin number.

Figure 5:
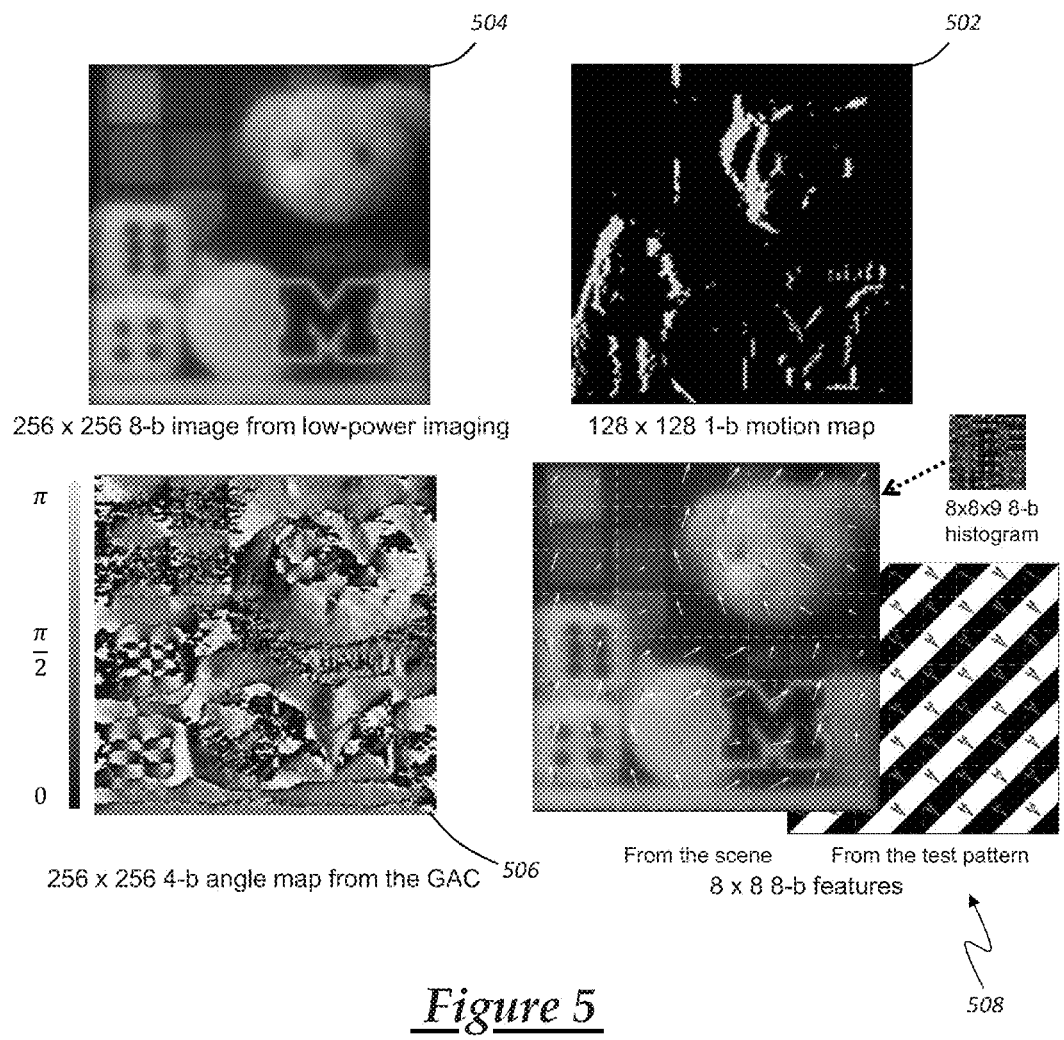
FIG. 5 depicts captured images from a prototype CMOS imaging sensor.

FIG. 5 shows captured images from a prototype chip that has been fabricated using a 0.18 µm CMOS process. These images include a 128×128 image motion map 502 and a 256×256 image 504 from the in-pixel single-slope ADC. A 256×256 angle map 506 shows the angle calculated from the GAC. A 8 b feature 508 from 8×8 blocks are shown with the vector. In the 8 b feature 508, only two angles that have the biggest magnitude are shown for simplicity.

Figure 7:
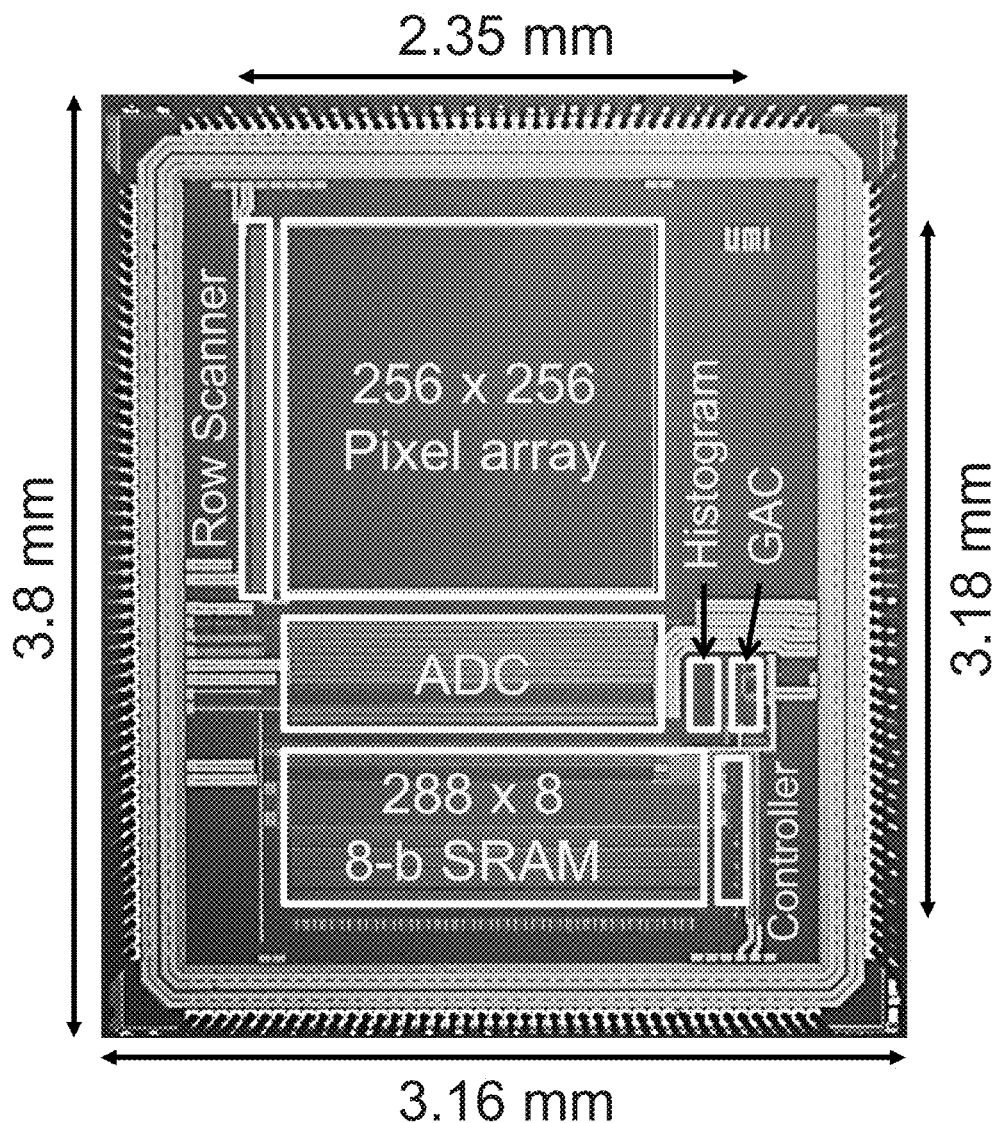
FIG. 7 is a micrograph depicting an exemplary CMOS imaging sensor chip.

In FIG. 6, the performance of an exemplary CMOS sensor is summarized. In order to verify the performance of the integrated feature extraction unit, the object detection from the extracted features capabilities were tested using 200 pedestrian images. For testing, test images were inputted serially into an 8 b latch in a column/parallel ADC and a feature was generated. The test resulted in a 94.5% detection rate. During the test, a normalized power of 13.46 pW/frame·pixel was detected during motion sensing while 51.94 pW/frame·pixel was detected during feature extraction. A micrograph depicting the CMOS chip discussed with respect to FIG. 6 is shown in FIG. 7.

Other features of the CMOS sensors and multi-mode operation scheme carried out by such sensors are worth discussing. For instance, the proposed CMOS sensors consume low power, which can be helpful for wireless sensor network applications. In the CMOS sensor, a small pixel pitch can be helpful because the parasitic capacitance of metal tine ($C_m$) is linearly increased according to the pixel pitch ($W_{PIXEL}$) as follows:

$$C_m = N_{PIXEL} \times W_{PIXEL} \times c_m$$

where $N_{PIXEL}$ is the number of pixels and $C_m$ is the parasitic capacitance per µm. Since the power consumption is proportional to the capacitance, the CMOS sensor can benefit from a small pixel pitch. However, a small pixel pitch can decrease the sensitivity of the pixel due to a reduced fill factor. Thus, it can be helpful to keep a high fill factor while reducing the pixel pitch. Many low-power sensors use additional in-pixel circuits or use pMOS transistors for the in-pixel event generation or in-pixel ADC. In contrast, the CMOS sensors described herein can use differential pixel topology by grouping two vertically neighboring pixels that can achieve in-pixel ADC without additional transistors. Additional in-pixel memory can be implemented with a MIM capacitor and located on the top of pixel circuits in order to minimize pixel pitch. In this way, the CMOS sensors described herein can be implemented in one embodiment using a 5.9 µm pixel pitch with a 30% fill factor. To compare power consumption, a power figure of merit (FOM) can be used. The power FOM may be defined as the power normalized to frame rate and the number of pixels, given by power/frame·pixel. Table 1 shows the power FOM comparison between the CMOS sensors described herein and other sensors. The motion sensing in the CMOS sensor currently described can have a 13.46 pW power FOM, a 51.94 pW in the feature extraction including the imaging power, which is the lowest power consumption shown in the comparison of FIG. 8.

Figure 9:
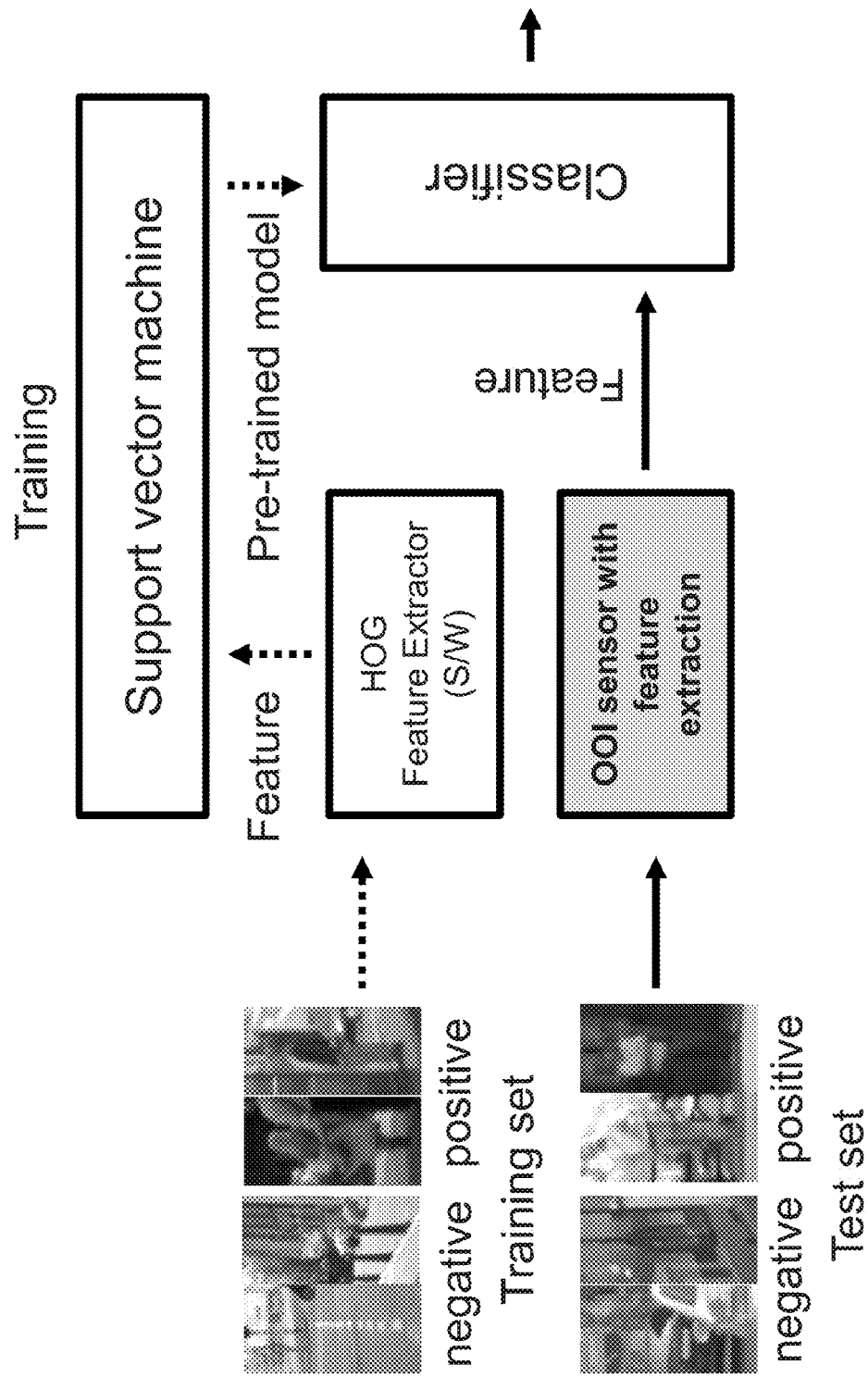
FIG. 9 is a block diagram of an object detection procedure that may be used with the CMOS sensors described herein.

Shown in FIG. 9 is another exemplary object detection procedure. The object detection can use a classifier with an embedded classification algorithm. The classifier can identify an object-of-interest to generate a 1 b output of the detection result. In order to classify the object-of-interest, a pre-trained model can be loaded on the classifier. The pre-trained model can use another algorithm, such as support vector machine (SVM), that is a supervised learning model with associated learning algorithms to analyze incoming data and recognize the patterns. To train such a model, many (training) image sets can be used. In one embodiment, more than 1,000 images can be used to train a model. This training set includes both positive images (with the target object) and negative images (without target object). For the object detection testing, a different set of images (test image set) can be used. The feature can be input into the trained classifier and the detection rate can be measured. In one implementation, it is possible to use simple SVM for the training and SVM classifier without any advanced algorithms in MATLAB. 1,000 training images were used (500 positive, 500 negative) for the training In order to measure the detection rate, 200 test image sets (100 positive, 100 negative) used. The test images were serially input into the latch in the single-slope ADC and generated HOG feature of the fabricated chip and input to the classifier. Such a test resulted in a 95% detection rate for the positive image set and 94% detection rate for the negative image set. The overall detection rate is 94.5%.

Figure 10:
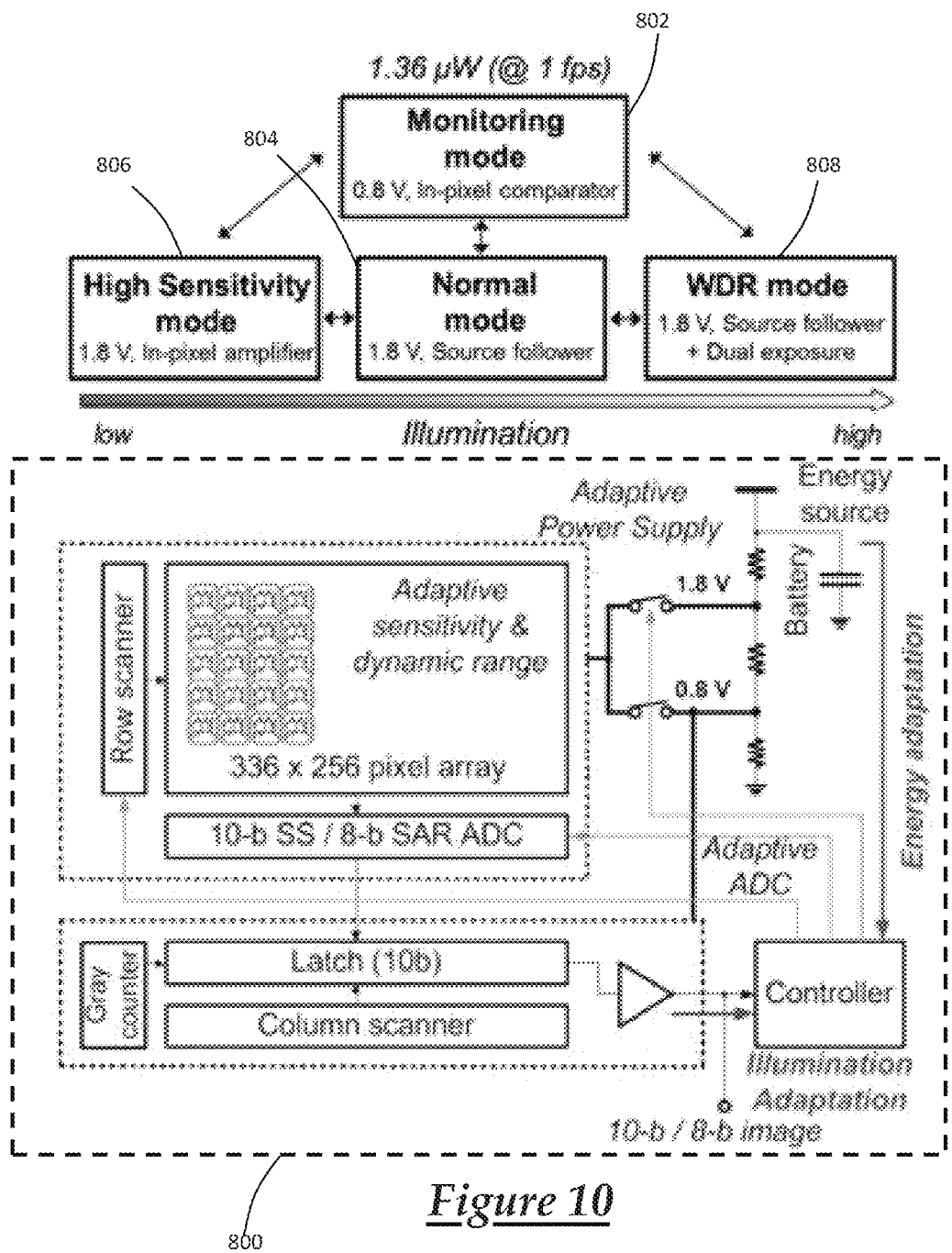
FIG. 10 is a block diagram depicting another exemplary embodiment of a multi-mode CMOS imaging sensor.

Turning to FIG. 10, a block diagram is shown of another exemplary embodiment 800 of a multi-mode CMOS sensor chip. The CMOS sensor chip 800 can use four modes: monitoring 802, normal 804, high sensitivity 806, and wide-dynamic-range (WDR) 808. The modes can help the chip 800 adapt to environmental changes (i.e., the sensor chip monitors at an extremely low-power monitoring mode until a change in illumination/motion is detected) or the sensor chip 800 is directed to change modes at which time the sensor chip 800 enters the high-sensitivity mode or WDR mode. The sensor chip 800 can return to the monitoring mode as a default or when the amount of power supplied to the chip 800 falls below a certain level.

In the monitoring mode 802, the sensor chip 800 can operate at 0.8 V. In-pixel comparators and 8 b successive-approximation (SAR) ADCs can enable power saving. For an in-pixel ADC, a SAR was chosen because its short conversion time (8 cycles) can minimize power consumption. For the other three modes, 10 b single-slope (SS) ADCs may be used, which operate at 1.8V. In the high-sensitivity mode 806, in-pixel differential common-source amplifiers can suppress the input-referred noise in dark conditions. In the normal mode 804, the signal can be read out through a source follower as in conventional sensors. While in the WDR mode 808, dual exposure can prevent the signal from being saturated. The column-parallel ADCs and 10b latches can be reconfigured to be used as either an 8 b SAR or 10 b SS ADCs depending on the selected mode. A column scanner can access the latch and the image signals are read through sensing amplifiers.

Figure 11:
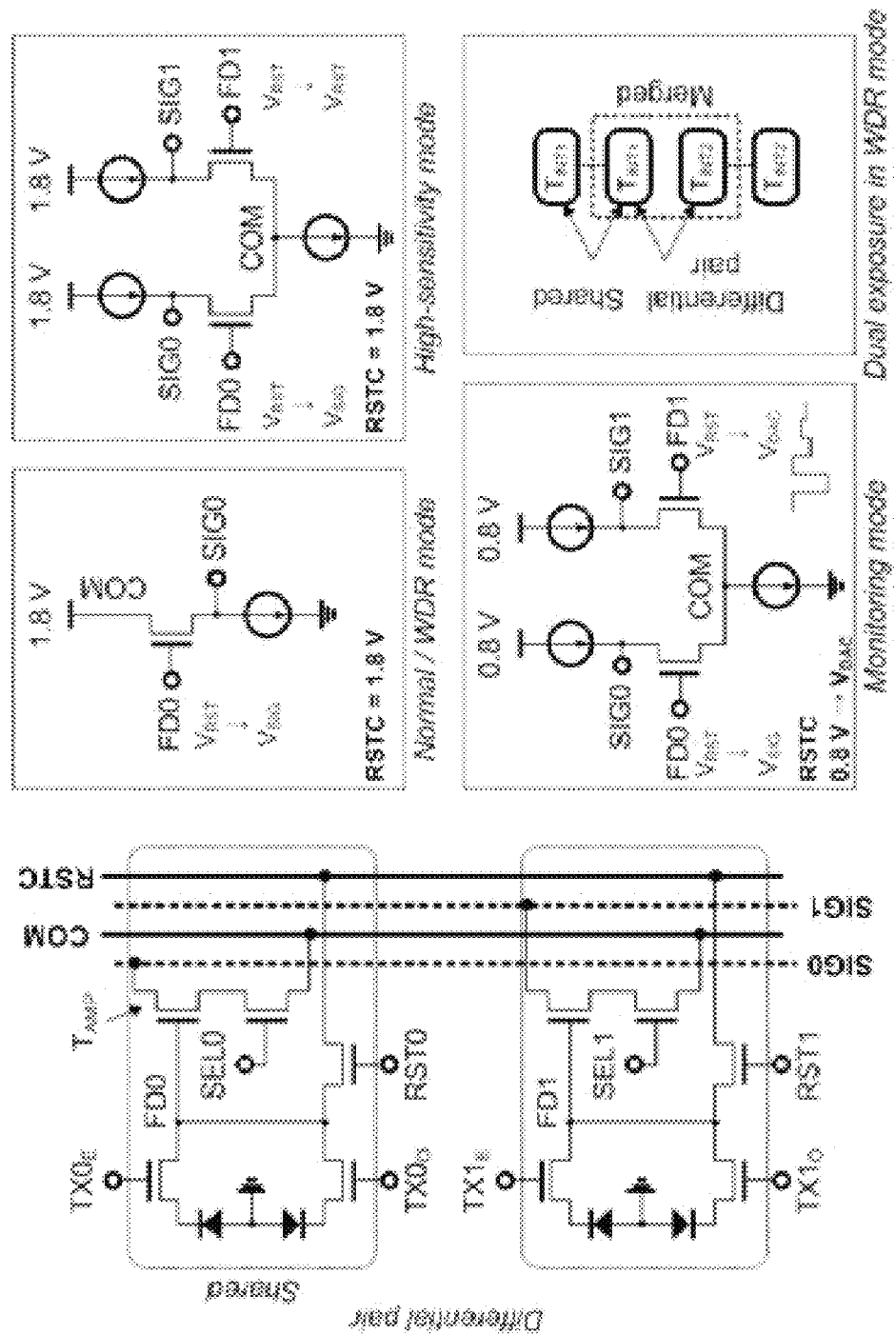
FIG. 11 depicts another exemplary embodiment of a pixel used with the CMOS imaging sensor of FIG. 10, along with equivalent circuits for particular operating modes.

FIG. 11 shows the pixel architecture of the CMOS sensor chip 800 and the equivalent circuits of the chip 800 that are used for each of the four modes. Two pixels can be vertically shared and form one group. Two groups can form a differential pair of in-pixel differential amplifiers. This differential configuration can eliminate a gain loss from the body effect in the source follower. In order to reduce the $V_{GS}$ drop and increase the signal swing, low-$V_t$ transistors can be used for '$T_{AMP}$,' The control signals for transmission gates, 'TX0' and 'TX1,' are boosted by the bootstrap circuit outside the pixel. For differential readout, each group can use separate signal lines, 'SIG0' and 'SIG1' The 'COM' line, which is common to two groups, can be connected to either a pixel power supply (for source-follower operation) or a current bias (for differential-amplifier operation). 'RSTC' can be connected to a capacitive DAC for the in-pixel SAR ADC in the monitoring mode or it can be connected to a pixel power supply for a reset operation.

In the monitoring mode, the pixel can operate as a preamplifier for the SAR ADC at 0.8V. The signal from the column-parallel capacitive DAC can be provided through 'RSTC' and the in-pixel preamplifier generates the amplified comparison signal in each conversion cycle. Since the pixel is operating at 0.8V in this mode, it may be difficult to achieve a complete charge transfer from the pinned photo-diode due to low reset level in the floating diffusion. As a result, it is possible to apply charge sharing (i.e., sharing the integrated charge with the floating diffusion by opening the transfer gate). Doing so can disable true CDS as in a 3T pixel.

In normal mode, the pixel circuit can be configured as a source follower, which is similar to the conventional 4T pixel. In high sensitivity mode, in-pixel differential common-source amplifiers can provide an increased gain (>6). WDR mode can use the same circuit as the normal mode except that the even group can use a regular integration time ($T_{INT1}$) while the odd group may use a short integration time ($T_{INT2}$). In the readout, one row from the even group and one row from the odd group may be merged and generate a signal with enhanced dynamic range. This scheme can sacrifice half of the resolution but still be adequate for the low-power application because no additional in-pixel element or image reconstruction is required.

Figure 12:
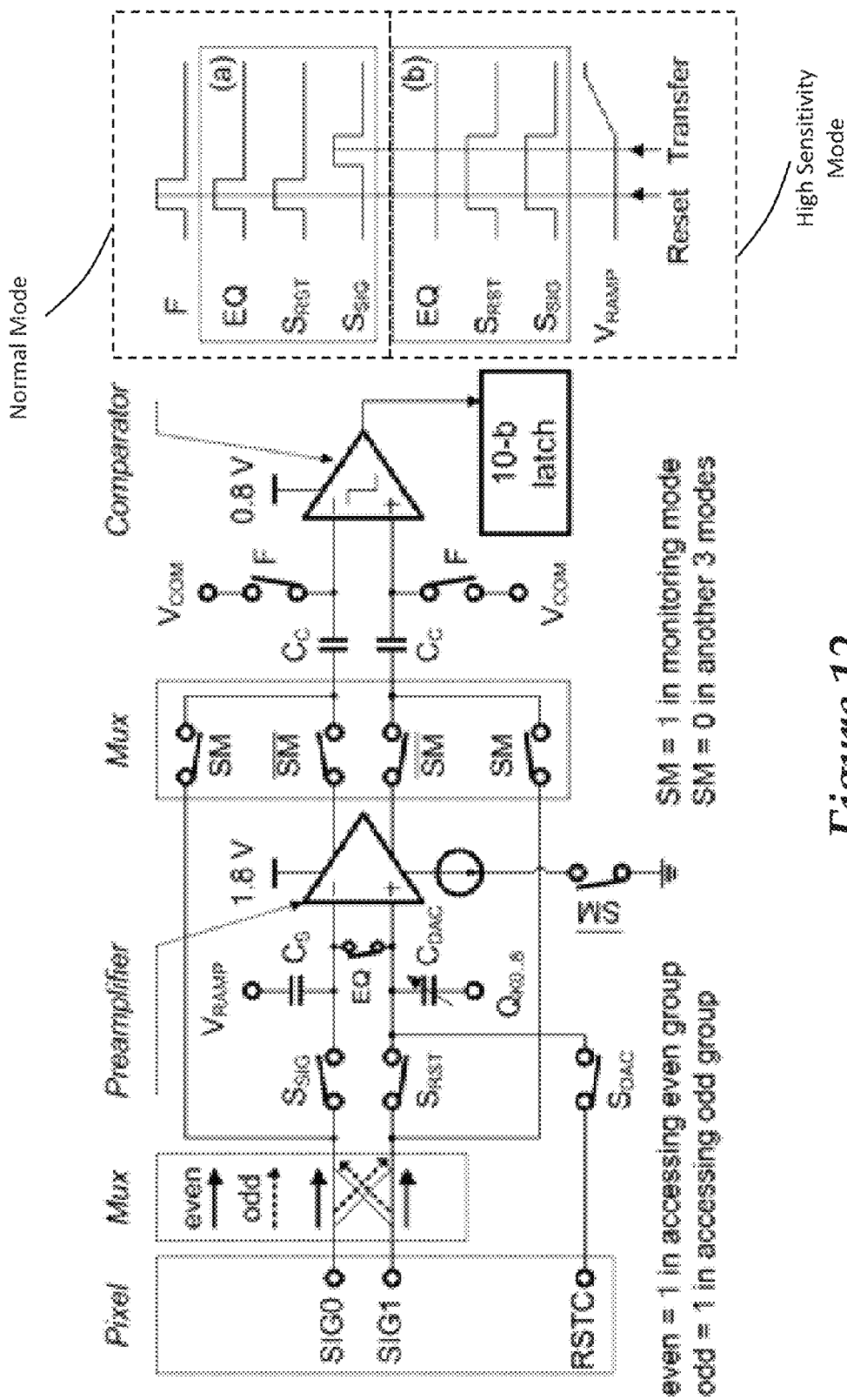
FIG. 12 depicts an exemplary embodiment of a column-parallel ADC used with the CMOS imaging sensor of FIG. 10.

FIG. 12 shows an example of how the column-parallel el ADC can be implemented. The ADC can include a preamplifier operating at 1.8 V, a dynamic comparator at 0.8 V, and switches for mode configuration. In the monitoring mode, only 0.8 V is supplied and column-level preamplifiers can be turned off for power saving. The amplified signal from the pixel ('SIG0', 'SIG1') may be directly delivered to the dynamic comparator through 'SM' for the SAR ADC. The capacitive DAC ('$C_{DAC}$') drives the 'RSTC' line from 0.8V supply. Since the parasitic capacitance of the 'RSTC' line may be sufficient for generating a stable voltage, no additional circuits or capacitors are required to generate a reference voltage in the ADC. The measured reference signal swing for the current implementation is 0.41 V. In the other three modes, the column-parallel ADC can operate as an SS ADC. The coupling capacitor '$C_C$' can store the offset of the preamplifier and suppress the column FPN. In the normal and WDR modes, reset voltage can be sampled in the $C_{DAC}$, signal voltage can be sampled in the $C_S$, and $V_{RAMP}$ can be swept. With respect to the high-sensitivity mode, the operation can be fully differential (i.e., the differential signal from the pixel may be sampled in $C_S$ and $C_{DAC}$ simultaneously).

Figure 13:
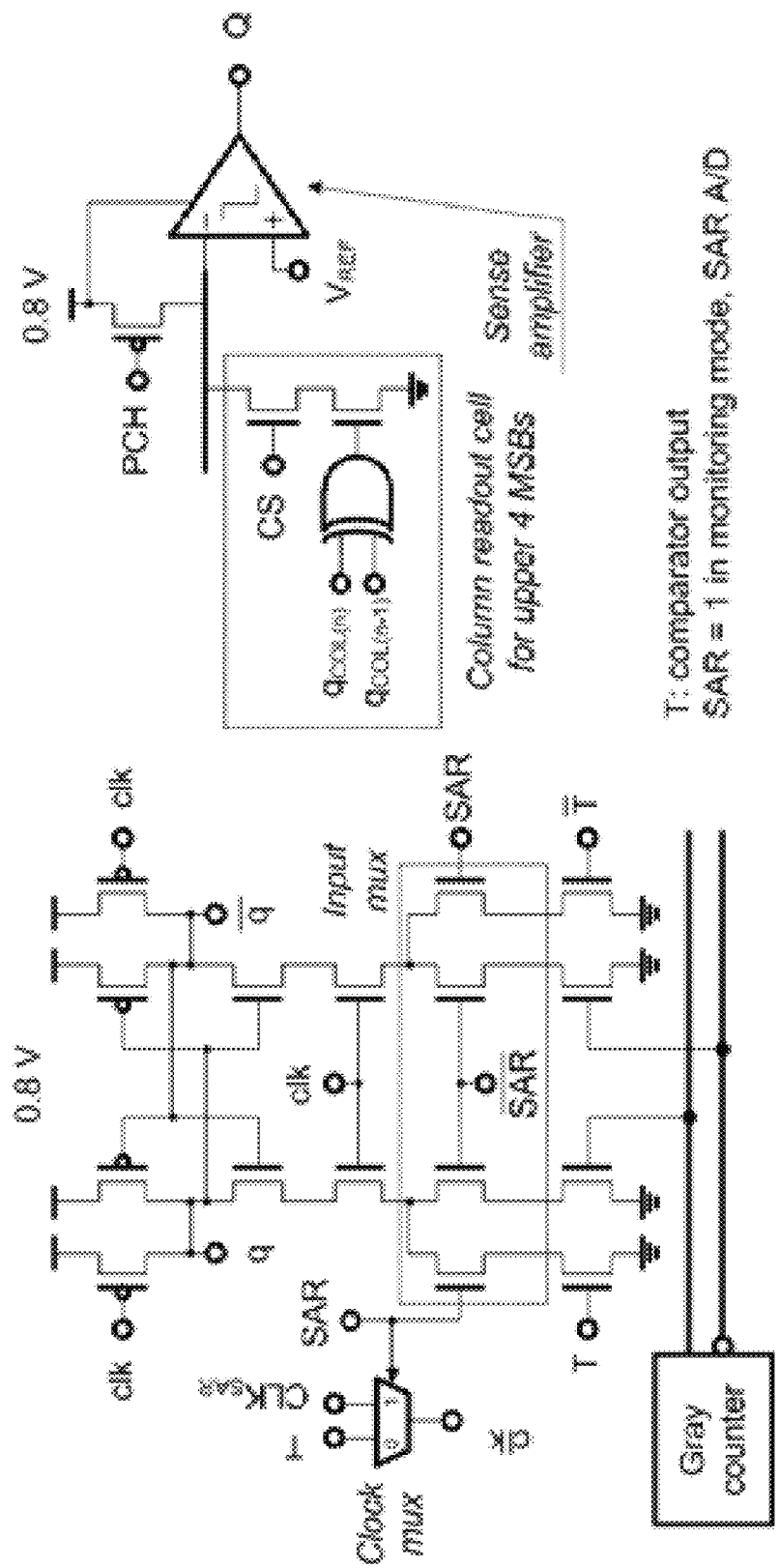
FIG. 13 depicts an exemplary embodiment of a latch used with the CMOS imaging sensor of FIG. 10.

FIG. 13 shows an example of the latch used with the column parallel ADC as well as the digital signal readout path. The latch can operates for both the SAR and SS ADC configurations by multiplexing the input. Differential latching can reduce switching power because the latch only switches once during the SS ADC, whereas the SRAM or transfer-gate-based flip-flops change their state as the counter signal changes. The pre-charged line (sense amplifier input) can be discharged through the readout cell according to the stored value in the latch. For upper 4 MSBs, instead of directly accessing the signal, it is possible to only read inequality between neighboring columns in order to suppress the dynamic current during pre-charge cycles. Since most image signals typically have locally similar values, it is possible to avoid unnecessary discharge by using an XOR gate if the two neighboring columns have the same MSBs. One hundred image samples were tested and during the processing of those images the power reduction was measured to be: 1) 68% when measuring the reduction from the pre charge scheme to read out the 4 MSBs; and 2) 5% when we consider total chip power in the monitoring mode.

Figure 14:
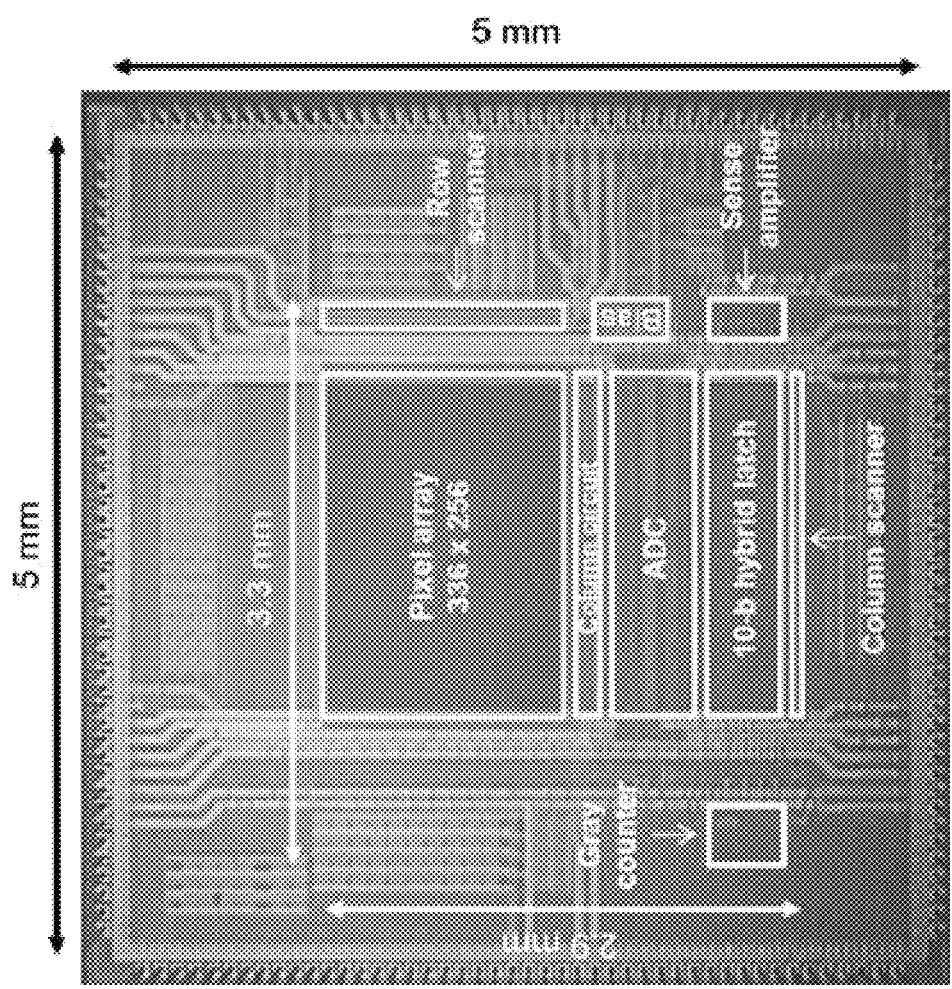
FIG. 14 depicts an image of a prototype CMOS sensor chip constructed according to the design of FIG. 10.

FIG. 14 depicts a die micrograph of a prototype CMOS sensor chip and FIG. 15 is a table summarizing the performance of the sensor chip. The prototype was fabricated using a 0.18 µm CIS process. A normalized power of 15.4 pW/frame·pixel (from the total power consumption) was achieved in monitoring mode.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of operating a complementary metal oxide semiconductor (CMOS) imaging sensor having a pixel array and pixel processing circuitry, comprising the steps of:
   (a) operating the CMOS imaging sensor in an in-pixel motion-detecting mode at a first power level using circuitry on the imaging sensor that generates motion data based on received images detected by pixels in the pixel array, wherein when in the in-pixel motion-detecting mode, a pair of pixels in the pixel array are merged and a previous frame signal generated by the merged pixels and a current frame signal generated by the merged pixels are compared by an in-pixel comparator to determine a frame difference therebetween, and further wherein a quantized frame-difference signal is generated by the in-pixel comparator when motion is detected based on the frame difference;
   (b) switching the imaging sensor from the motion-detecting mode to a feature extraction mode in response to detecting motion; and
   (c) operating the imaging sensor in the feature extraction mode at a second power level that is higher than the first power level, wherein operating in the feature extraction mode comprises:
      receiving pixel data from the pixel array;
      calculating spatial gradients based on the received pixel data;
      determining angular information associated with the spatial gradients using a gradient-to-analog converter comprising mixed-signal processing circuitry by:
         converting the spatial gradients into analog values;
         generating an analog trigonometric value of the spatial gradients; and
         determining angular information associated with the spatial gradients based on the analog trigonometric value; and
      determining magnitudes of the spatial gradients associated with the angular information;
   wherein the imaging sensor generates extracted feature data from one or more received images when operating in the feature extraction mode.

2. The method of claim 1, further comprising the step of (d) switching from the feature extraction mode to an image capture mode based on analysis of the extracted feature data.

3. The method of claim 2, further comprising the steps of (e) operating the imaging sensor in the image capture mode and storing or transmitting received images at a third power level that is higher than the second power level.

4. The method of claim 2, wherein step (d) is carried out in response to detecting an object in one of the received images.

5. The method of claim 2, wherein the extracted feature data comprises histograms of oriented gradients generated from the one or more received images.

6. The method of claim 1, wherein step (a) further comprises generating 1 bit motion data for at least some of the pixels in the pixel array.

7. The method of claim 6, wherein step (a) further comprises generating the 1 bit motion data for a subset of the pixels used for generating the extracted feature data.

8. An imaging device having a CMOS imaging sensor that operates according to the method of claim 1.

9. The method of claim 1, wherein receiving pixel data comprises receiving a plurality of rows or columns of pixel data from the pixel array; and wherein
   calculating spatial gradients based on the received pixel data comprises
   calculating spatial gradients based on the received rows or columns of pixel data.

10. The method of claim 9, wherein determining magnitudes of the spatial gradients associated with the angular information comprises generating a histogram of gradients.

11. The method of claim 1, wherein when in the motion-detecting mode, the method further comprises:
   sampling, by a first in-pixel capacitor of one of the pair of pixels, the previous frame signal; and
   sampling, by a second in-pixel capacitor of the other of the pair of pixels, the current frame signal, and
   further wherein the in-pixel comparator determines the frame difference between the previous and current frame signals stored by the first and second in-pixel capacitors, respectively.

12. The method of claim 11, wherein the previous frame signal is sampled by connecting the two pixels of the pair of pixels to the first in-pixel capacitor, and the current frame signal is sampled by connecting the two pixels of the pair of pixels to the second in-pixel capacitor.

13. A method of operating a complementary metal oxide semiconductor (CMOS) imaging sensor having a pixel array and pixel processing circuitry in an in-pixel motion detecting mode using circuitry on the imaging sensor that generates motion data based on received images detected by pixels in the pixel array, comprising:
   sampling, by a first in-pixel capacitor of one of a pair of pixels, an analog previous frame signal, wherein the analog previous frame signal is sampled by connecting the two pixels of the pair of pixels to the first in-pixel capacitor;
   sampling, by a second in-pixel capacitor of the other of the pair of pixels, an analog current frame signal, wherein the analog current frame signal is sampled by connecting the two pixels of the pair of pixels to the second in-pixel capacitor;
   determining, by one or more in-pixel transistors reconfigured as an in-pixel comparator, a frame difference between the analog previous and current frame signals sampled by the first and second in-pixel capacitors, respectively; and generating, by the one or more in-pixel transistors reconfigured as the in-pixel comparator, a quantized digital frame-difference signal when motion is detected based on the frame difference.

14. The method of claim 13, wherein the generating step comprises generating a 1-bit frame-difference signal when motion is detected.

15. An imaging device having a CMOS imaging sensor that operates according to the method of claim 13.

\* \* \* \* \*